Patented May 22, 1951

2,553,783

UNITED STATES PATENT OFFICE 2,553,783

PROCESS FOR STABILIZING STERILE EVAPORATED MILK

Samuel R. Park, Toledo, Ohio, assignor to W. E. Mallory & Company, Ann Arbor, Mich., a corporation of Michigan No Drawing. Application November 19, 1948, Serial No. 61,131

4 Claims. (Cl. 99—55)

The present invention relates to a process for producing sterile evaporated milk of the proper body or viscosity without the necessity of adding stabilizing salts; and this application is a continuation-in-part of applicant's copending application Serial No. 471,013, filed January 1, 1943, now abandoned.

Canned evaporated milk must be sterilized to impart keeping qualities; and it has been conventional practice in all evaporated milk canneries for many years to can the evaporated milk and then sterilize by elevating the temperature of the cans to from 240° F. to 245° F. over a period of from fifteen to twenty minutes. Serious difficulties have been encountered because of the instability of evaporated milk under sterilizing conditions. While the heat stability of milk from different sources and even that from the same cows at different periods varies widely, a substantial proportion of all commercial milk, in the absence of special treatment, lacks the heat stability necessary to withstand sterilization without coagulating. Accordingly, a great deal of effort has been expended in an attempt to devise a satisfactory method of imparting the proper stability to evaporated milk. The problem is not simply one of imparting sufficient stability because excessive heat stability is also objectionable as it results in sterile milk lacking in body and which tends to separate in the can.

The generally accepted measure of heat stability is the time during which the evaporated milk can withstand a temperature of 239° F. without coagulating (i. e., forming a jell). It is well known that if the evaporated milk has a heat stability of from a few minutes over the sterilizing time to approximately twice the sterilizing time, satisfactory body can be obtained.

Two methods have been known for adjusting the heat stability of milk during the process of producing sterile evaporated milk. The first is by the "forewarming" of the milk prior to evaporation. It has been established that the stability of milk may be increased by heating it to and holding it at elevated temperatures for limited times prior to evaporation. In general, the higher the forewarming temperature between 200° F. and 300° F., the greater the heat stability of the sterilized product. To a lesser degree, stability increases with the time of exposure to any given temperature. Care must always be exercised in heating milk to avoid imparting a dark color or a cooked taste. It has been recognized that for any given temperature the time of exposure must be limited to avoid these difficulties, the maximum permissible time being greater for the lower temperatures than the higher. Thus, milk may be held at a temperature from 200° F. to 212° F. for a period up to twenty-five minutes but can only be held a few seconds at 300° F. It has been noted that for each increase in temperature of 18° F., the time should be decreased approximately two and one-half fold.

Forewarming, alone, has not proven satisfactory as a means of imparting proper stability to evaporated milk because of the difficulty of adjusting the time and temperature of forewarming to the proper values. This problem is greatly aggravated by the constantly varying properties of commercial milk, the large volumes which must be handled in commercial canneries and the inherent inflexibility of the equipment used. Thus, on some occasions forewarming to approximately 212° F. for from ten to twenty-five minutes will impart proper stability, but frequently the stability after such forewarming is inadequate. Occasionally, milk forewarmed to temperatures of 230° F. or higher has excessive stability, but in others satisfactory stability is obtained at temperatures as high as 235° F. to 248° F. for short periods. Consequently, it has long been the standard practice to forewarm the milk to a fixed temperature and for a fixed period calculated to avoid over-stabilization (usually from 200° F. to 212° F. for ten to twenty-five minutes). As a result, the forewarmed milk frequently has insufficient heat stability. The necessary additional stability is then imparted to the milk by the addition of water solutions of so-called "stabilizing salts," such as disodium phosphate or sodium citrate. Due to the day-to-day variations in the properties of the milk handled in commercial canneries and the substantial differences between milk from different geographical areas, the amount of salts required varies widely; and it is impossible by any known chemical or physical test to determine the proper amount except by cut and try methods. It is standard practice in all evaporated milk canneries to determine the amount of salts required each day by adding progressively increasing quantities of salts to about ten samples of the evaporated milk. Each sample is canned and sterilized in a pilot sterilizer. The cans are then opened and their contents examined to determine which has the proper body. In actual practice, it is found that the amount of salts required may vary from none to as much as twenty ounces of dry salt per one thousand pounds of evaporated milk, although the usual range is from two to ten ounces.

The use of stabilizing salts is objectionable, not only because they are adulterants but because their cost is substantial.

Accordingly, it is the object of the present invention to provide a novel method which is suitable for use in commercial evaporated milk canneries to produce sterile evaporated milk of proper body without the use of stabilizing salts or other adulterants.

In accordance with the present invention, the desired result is achieved by blending suitable proportions of milk which has been intentionally over-stabilized by heat treatment with milk which is lacking in stability, and sterilizing the mixture. This method has the advantage for commercial use that part of the milk processed in a given plant may be subject to the conventional process which produces milk that is under-stabilized. This milk is then mixed with milk which has been intentionally over-stabilized by special heat treatment. The proper proportions of the mixture must be determined from day to day by the above-described empirical tests currently used to determine the amount of stabilizing salt required, the only difference being that each sample will have different proportions of the two types of milk instead of varying amounts of stabilizing salts. The heat exchanger used for the specially heat-treated portion may also be of a type which heats the milk to a fixed temperature for a fixed time, and this equipment is then run only long enough each day to produce the necessary amount of over-stabilized milk.

The treated and untreated milks may be combined before or after evaporation. Thus, a portion of the incoming milk supply may be over-stabilized by heat treatment, and then mixed with the untreated milk and the mixture evaporated and sterilized. This method has the advantage that the higher temperature employed to over-stabilize one portion is utilized to speed up the subsequent evaporation of all of the milk; but to make the necessary cut and trial tests, the trial samples must be evaporated.

Alternatively, unstable and over-stabilized portions may be evaporated in separate evaporators or in the same evaporator at different times, and thereafter mixed in the proper proportions and sterilized.

As a second alternative, all of the milk may be evaporated together in the conventional manner to produce unstable evaporated milk and thereafter a portion of the evaporated milk subject to the heat treatment to over-stabilize that portion. The two portions are then remixed and sterilized.

With both of the alternative methods described, the samples taken for the cut and trial tests are taken after evaporation.

It will be apparent from the foregoing that the times and temperatures for the over-stabilizing heat treatment are a matter of choice based on principles well known to those skilled in the art of preparing sterile evaporated milk. Temperatures as low as 230° F. would be effective under some circumstances, and temperatures as high as 300° F. may be employed. As is well known, the time of exposure to any selected temperature must be limited to prevent injury to the milk and, in general, longer times are required at the lower temperatures and vice versa to produce the same results. As a general guide, the milk may be held at 230° F. for about twenty minutes and at 300° F. for from two to fifteen seconds.

In actual practice, the availability and cost of equipment and other practical considerations may govern the selection of a combination of time and temperature for the treatment used to over-stabilize the milk. This may in some cases result in the choice of temperatures in the lower portion of the range and relatively long times of exposure. However, it is preferred to employ heat treatment at temperatures in the order of from 250° F. for a maximum period of about three to four minutes to 300° F. for a period of about one to two seconds for the portion of the milk which is over-stabilized, since that practice insures substantial over-stabilization of practically all types of milk which will be encountered in a commercial cannery and thus reduces the ratio of the heat-treated portion to the untreated or unstable milk in the final mixture. The remaining or untreated portion of the milk may have the usual treatment conventionally employed in evaporated milk canneries, or may even be subject to higher forewarming temperatures than the usual maximum of 212° F. so long as care is exercised that it is not over-stabilized.

Depending upon the character of the milk supply and the processes to which the two portions of the milk are subject, the amount of heat-treated over-stabilized milk required in the mixture may range from none on some occasions to sixty per cent or more. As a general rule, however, for any given installation the proportion will not vary over such wide limits. If the under-stabilized milk is almost stable and the over-stabilized milk is highly over-stable, the amount of the latter required will be quite small, and vice versa.

What is claimed is:

1. The process of producing sterile evaporated milk which consists in sterilizing by heat evaporated milk made up of a mixture of two quantities of milk of approximately the same composition, one of said quantities being of milk having insufficient heat stability to withstand sterilization by heat without coagulation, said process including the steps prior to sterilization of subjecting the other quantity of milk to a heat treatment at a temperature between 250° F. and 300° F. for about two seconds at the higher temperature to a maximum of about four minutes at the lower temperature to give the milk excessive heat stability and lack of body after sterilization by heat, and mixing said quantities in proportions which as determined by empirical tests will produce milk of proper heat stability, said process including the step of evaporating all of said milk prior to said sterilization.

2. The process of producing sterile evaporated milk which consists in heat-treating a quantity of milk at a temperature between 250° F. and 300° F. for about two seconds at the higher temperature to a maximum of about four minutes at the lower temperature to give the milk excessive heat stability and lack of body after sterilization by heat, mixing said quantity of milk with another quantity of milk having insufficient heat stability to withstand sterilization by heat without coagulation, the proportions of said quantities in the mixture being proportions determined by empirical tests to produce milk of proper heat stability, evaporating the mixture, and sterilizing the evaporated milk by heating the same.

3. The process of producing sterile evaporated milk which consists in heat-treating a quantity of milk at a temperature between 250° F. and 300° F. for about two seconds at the higher temperature to a maximum of about four minutes at the lower temperature to give the milk excessive heat stability and lack of body after sterilization by heat, evaporating said quantity of milk, mixing the evaporated milk with another quantity of evaporated milk which has insufficient heat stability to withstand sterilization by heat without coagulation, the proportions of said quantities in the mixture being proportions determined by empirical tests to produce milk of proper heat stability, and sterilizing the mixture by heating the same.

4. The process of producing sterile evaporated milk which consists in heat-treating a quantity of evaporated milk at a temperature between 250° F. and 300° F. for about two seconds at the higher temperature to a maximum of about four minutes at the lower temperature to give the milk excessive heat stability and lack of body after sterilization by heat, mixing said heat-treated evaporated milk with another quantity of evaporated milk having insufficient heat stability to withstand sterilization by heat without coagulation, the proportions of said quantities in the mixture being proportions determined by empirical tests to produce evaporated milk of proper heat stability, and sterilizing the mixture by heating the same.

SAMUEL R. PARK.

REFERENCES CITED

The following references are of record in the file of this patent:

UNITED STATES PATENTS

| Number | Name | Date |
| --- | --- | --- |
| 612,561 | Dodd | Oct. 18, 1898 |
| 1,168,823 | Nielsen | Jan. 18, 1916 |
| 1,432,686 | Grindrod | Oct. 17, 1922 |
| 1,710,508 | North | Apr. 23, 1929 |
| 2,282,800 | Musher | May 12, 1942 |
| 2,290,889 | Mook | July 28, 1942 |

OTHER REFERENCES

Journal of Dairy Science, April 1942 cited, pages 302 to 311.

Fundamentals of Dairy Science, by the Associates of Rogers, 2d ed. 1935, Reinhold Publishing Corp., pp. 208–209.

Condensed Milk and Milk Powder, by Hunziker, 5th ed. 1935.

Journal of Dairy Science, Jan. 1929, "The Relations of Temperature and Time of Forewarming of Milk to the Heat Stability of Its Evaporated Product" by Deysher, Webb and Holm.

Journal of Dairy Science, Nov. 1928, "Heat Coagulation of Evaporated Milk as Affected by Mixing Different Grades of Raw Milk" by Webb, p. 471.

Journal of Dairy Science, April 1942, "The Effect of High Temperature Short-Time Forewarming of Milk Upon the Heat Stability of its Evaporated Product," by Webb and Bell, p. 301.